United States Patent
Shimamura et al.

(10) Patent No.: US 6,879,554 B2
(45) Date of Patent: Apr. 12, 2005

(54) DISC PLAYER CAPABLE OF REPRODUCING A PARTIALLY RECORDED DISC

(75) Inventors: Takao Shimamura, Saitama (JP); Kenichi Takahashi, Saitama (JP); Shinya Honjou, Saitama (JP); Takashi Sasaki, Saitama (JP); Koichi Kikuchi, Saitama (JP); Yoshihiro Hashizuka, Saitama (JP); Hideaki Yoshimura, Saitama (JP); Takashi Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 404 days.

(21) Appl. No.: 09/749,631

(22) Filed: Dec. 28, 2000

(65) Prior Publication Data

US 2001/0017831 A1 Aug. 30, 2001

(30) Foreign Application Priority Data

Dec. 28, 1999 (JP) ............................................ 11-372179

(51) Int. Cl.⁷ .................................................. G11B 7/00
(52) U.S. Cl. ................... 369/53.22; 369/53.24
(58) Field of Search ............................ 369/53.24, 53.2, 369/53.22, 275.3, 44.25, 44.26, 44.29

(56) References Cited

U.S. PATENT DOCUMENTS 5,351,226 A * 9/1994 Mizumoto et al. ............. 369/47
6,298,024 B1 * 10/2001 Nomura .................... 369/53.22

* cited by examiner

*Primary Examiner*—Nabil Hindi
(74) *Attorney, Agent, or Firm*—Sughrue Mion, PLLC (57) ABSTRACT

A method for reproducing information recorded on a disc is provided. In the method, a reproduction signal is irradiated towards the disc to produce a corresponding read signal. Also, the reproduction signal is positioned at a first position within a non-program area of the disc and is attempted to be focused on the disc. If the reproduction signal is focused on the disc, the method determines if the read signal has a valid signal level. If the read signal does not have the valid signal level when the reproduction signal is positioned at the first position, the reproduction signal is moved to a second position within a program area of the disc while the reproduction signal remains focused on the disc. Then, the method determines if the read signal has the valid signal level when the reproduction signal is positioned at the second position. Also, a disc player that employs the method and a software program that instruct a controller to perform operations in accordance with the method are also provided.

58 Claims, 5 Drawing Sheets

CD-R BLANK DISC

FIG. 5A

CD-R PARTIALLY RECORDED DISC (PRD)

FIG. 5B

CD-R COMPLETELY RECORDED DISC

DISC PLAYER CAPABLE OF REPRODUCING A PARTIALLY RECORDED DISC

RELATED APPLICATIONS

This application claims priority from Japanese Application No. 11-372179, which is incorporated herein by reference for all purposes.

BACKGROUND OF THE INVENTION

1. Field of the Invention

The present invention relates to a disc player capable of reproducing information from a disc-shaped recording medium such as a compact disc ("CD"). In particular, the invention relates to a disc player that is capable of reproducing information from a direct-read-after-write disc, such as a CD recordable disc ("CD-R"), when information is only partially recorded on the disc.

2. Description of the Related Art

In recent years, CD-Rs have become popular recording media for recording data and reproducing data. Typically, in a CD-R, recording tracks are formed with spiraling guide grooves, and the guide grooves are wobbled or snaked at particular frequencies of a carrier wave which has been frequency-modulated to correspond to absolute time information. For instance, when travelling along the recording tracks towards the outer circumference of the CD-R, the frequency of the guide grooves changes so that the absolute time information increases, and a specific position of a recording track contained in the CD-R can be determined by evaluating the frequency of the guide grooves at such position and determining the absolute time information. In some CD-Rs, the absolute time information is represented by absolute time in pre-groove ("ATIP") data. By evaluating the guide grooves in a CD-R, a recording and/or reproducing apparatus is capable of performing a tracking control operation and controlling the spindle rotation of the CD-R.

Figure 5A:
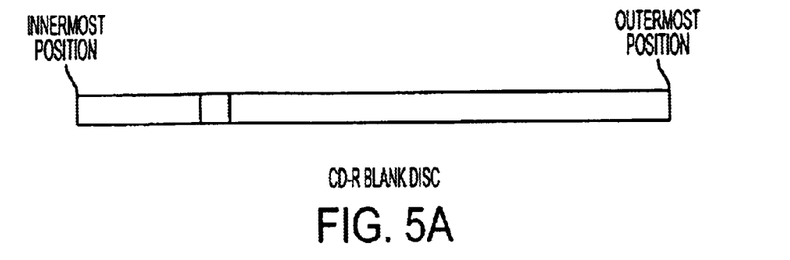
FIG. 5a shows an example of a blank disc.

In general, before any information is recorded on a CD-R, the CD-R is considered to be a blank disc. FIG. 5a shows an example of a cross-sectional view of a blank disc from the innermost position of the blank disc (i.e. a position close to the inner circumference of the disc) and an outermost diameter of the blank disc (i.e. a position close to the outer circumference of the disc). Also, after information is partially recorded on the CD-R, the CD-R is generally considered to be a partial disc. Furthermore, before all of the information is recorded on the partial disc, various information is not recorded at dedicated locations of the disc, and thus, the partial disc is not finally processed.

Figure 5B:
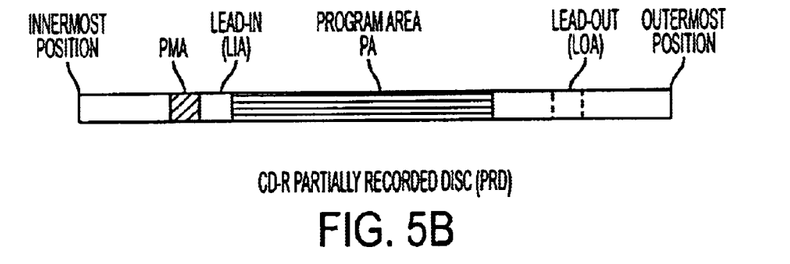
FIG. 5b shows an example of a partial disc.

An example of a partial disc is shown in FIG. 5b. As shown in the figure, recorded information, such as music information, is partially recorded in a program area PA. Furthermore, while before all of the information is completely recorded on the disc, temporary table of contents ("TOC") information is recorded in a program memory area PMA that is located between a lead-in area LIA of the disc and the innermost position of the disc. The temporary TOC information provides a recording history of the recorded information and typically contains a starting address and an ending address of the information that is recorded in the program area PA. Also, in the partial disc shown in FIG. 5b, no information is recorded in the lead-in area LIA or in the lead-out area LOA, and thus, the lead-in area LIA and the lead-out area LOA correspond to mirror surfaces.

Figure 5C:
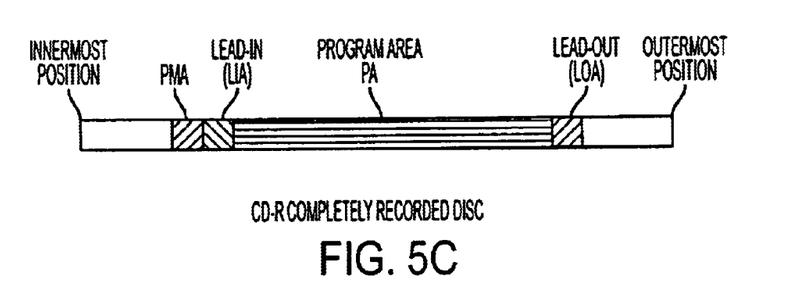
FIG. 5c shows an example of a disc after information has been completely recorded on the disc.
Figure 5D:
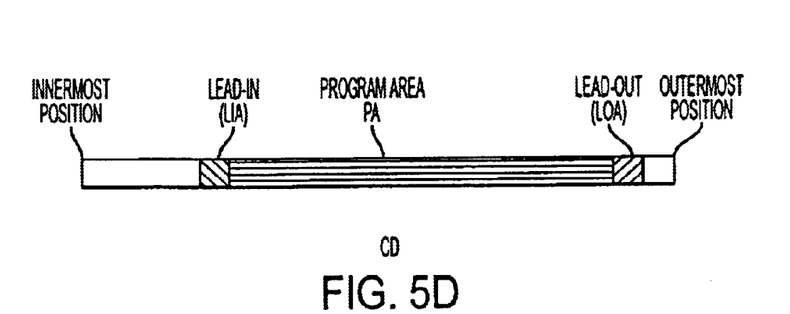
FIG. 5d shows an example of a digital audio compact disc.

After all of the information is completely recorded in the partial disc, the disc is finally processed via the recording apparatus (i.e. the disc is a finally processed disc). Specifically, the temporary TOC information contained in the program memory area PMA is recorded in the lead-in area LIA in a particular format, and a predetermined lead-out code identifying the lead-out area LOA is recorded in the lead-out area LOA. FIG. 5c shows the CD-R after it is finally processed, and as shown in FIG. 5d, the CD-R has substantially the same format as a digital audio CD ("CD-DA"). Therefore, an ordinary CD-DA reproducing apparatus can reproduce a CD-R that has been finally processed.

On the other hand, when a typical CD-DA reproducing apparatus (hereinafter referred to as a "CD reproducing apparatus") attempts to reproduce a disc, the optical pickup is initially located in the lead-in area LIA of the disc. Thus, the CD reproducing apparatus cannot reproduce a partial disc because the temporary TOC information is recorded in the program memory area PMA, and the lead-in area LIA has a mirror surface and does not contain any information. Thus, when the CD reproducing apparatus initially positions the pickup in the lead-in area LIA, it cannot read the temporary TOC information, cannot perform a tracking control operation, and cannot control a spindle servo.

In order to attempt to overcome such problem, various CD reproducing apparatuses have been proposed that are capable of reproducing a partial disc. For example, in Japanese Unexamined Patent Publication No. Hei. 5-205272, the present assignee proposed a method for reproducing a partial disc with a CD reproducing apparatus. The operation of the CD reproducing apparatus will be briefly described below in conjunction with FIG. 6, which is a cross-sectional view of a partial disc.

Figure 6:
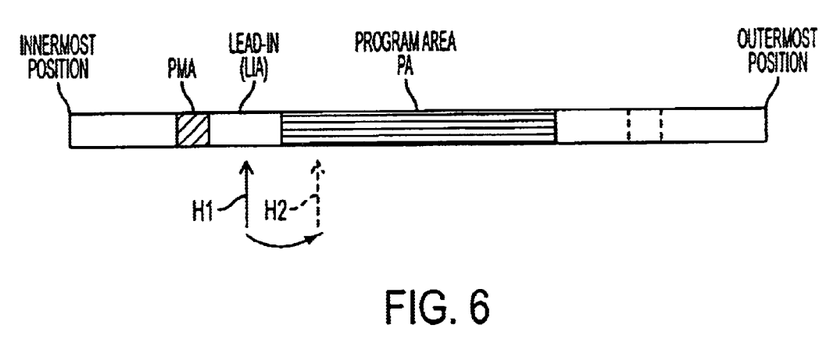
FIG. 6 shows an example of a partial disc and various positions at which a disc player attempts to reproduce information from the disc.

As shown in FIG. 6, the CD reproducing apparatus performs an initial setup operation by placing an optical pickup at a home position H1 beneath the lead-in area LIA of the partial disc and attempts to read information from the lead-in area LIA. If the CD reproducing apparatus can reproduce information from the lead-in area LIA, the initial setup operation has been performed successfully, and the reproducing apparatus performs a subsequent operation. However, if the apparatus cannot reproduce information from the lead-in area LIA, the initial setup operation has not been performed successfully, and the controller of the CD reproducing apparatus instructs the pickup to move to a position H2 beneath the program area PA. Then, a second setup operation is performed in which the apparatus attempts to reproduce information from the program area PA. If information can be reproduced from such area PA, the second setup operation is performed successfully, and the reproducing apparatus performs a subsequent operation. However, if the second setup operation cannot reproduce information while the pickup 3 is located at the position H2, the second setup operation is not successful, and the pickup is returned to the position H1. Then, a third setup operation is performed to attempt to reproduce information from the lead-in area LIA. The above procedure is repeated for a substantial amount of time.

As described above, when the conventional CD reproducing apparatus attempts to reproduce a partial disc, a plurality of setup operations must be repeatedly performed to attempt to read information from various areas LIA and PA of the disc. Therefore, the conventional CD reproducing apparatus takes a long time to determine the type of disc that is loaded in the apparatus and takes a long time to determine whether or not it is capable of reproducing information from the disc.

SUMMARY OF THE INVENTION

An object of the present invention is to overcome the above and other problems of the prior art.

Another object of the present invention is to provide a disc player capable of shortening the amount of time necessary to determine the type of disc loaded in the disc player.

Still another object of the present invention is to provide a disc player capable of shortening the amount of time necessary to start reproducing the information recorded on a disc.

Yet another object of the present invention is to provide a method employed by a disc player that is capable of shortening the amount of time necessary to determine the type of disc loaded in the disc player.

Even another object of the present invention is to provide a method employed by a disc player that is capable of shortening the amount of time necessary to start reproducing the information recorded on a disc.

A further object of the present invention is to provide a computer program executed by a disc player that shortens the amount of time necessary to determine the type of disc loaded in the disc player.

Yet a further object of the present invention is to provide a computer program that is executed by a disc player to shorten the amount of time necessary to start reproducing the information recorded on a disc.

In order to achieve the above and other objects, an apparatus for reproducing information recorded on a disc is provided. The apparatus comprises: a reading device that reads information recorded on said disc, wherein said reading device transmits a reproduction signal towards a said disc such that said reproduction signal reflects off of said disc to produce a reflected reproduction signal and wherein said reading device outputs a read signal based on said reflected reproduction signal; and a controller which positions said reading device at a first position within a non-program area of said disc and instructs said reading device to focus said reproduction signal on said disc, wherein said controller determines if said reading device is able to focus said reproduction signal on said disc by at least indirectly evaluating said read signal, wherein, if said reading device is able to focus said reproduction signal on said disc, said controller determines if said read signal output from said reading device has a valid signal level when said reading device is positioned at said first position, wherein, if said read signal does not have the valid signal level when said reading device is positioned at said first position, said controller moves said reading device to a second position within a program area of said disc while said reproduction signal remains focused on said disc, and wherein said controller determines if said read signal output from said reading device has the valid signal level when said reading device is positioned at said second position.

In order to additionally, achieve the above and other objects, an apparatus for reproducing information recorded on a disc is provided. The apparatus comprises: a reading device that reads information recorded on said disc and outputs a corresponding read signal; an amplifier that amplifies said read signal to produce an amplified signal; and a controller which positions said reading device at a first position within a non-program area of said disc and determines if said amplified signal output from said reading device has a valid signal level when said reading device is positioned at said first position by evaluating said amplified signal, wherein, if said amplified signal does not have the valid signal level when said reading device is positioned at said first position, said controller moves said reading device to a second position within a program area of said disc, wherein said controller determines if said amplified signal output from said reading device has the valid signal level when said reading device is positioned at said second position.

In order to further achieve the above and other objects, a method for reproducing information recorded on a disc. The method, in which a reproduction signal is irradiated towards said disc to produce a corresponding read signal, comprises: (a) positioning said reproduction signal at a first position within a non-program area of said disc; (b) attempting to focus said reproduction signal on said disc; (c) determining if said reproduction signal is focused on said disc by at least indirectly evaluating said read signal; (d) if said reproduction signal is focused on said disc, determining if said read signal has a valid signal level when said reproduction signal is positioned at said first position; (e) if said read signal does not have the valid signal level when said reproduction signal is positioned at said first position, moving said reproduction signal to a second position within a program area of said disc while said reproduction signal remains focused on said disc; and (f) determining if said read signal has the valid signal level when said reproduction signal is positioned at said second position.

In order to even additionally achieve the above and other objects, a method for reproducing information recorded on a disc is provided. The method, in which a reproduction signal is irradiated towards said disc to produce a corresponding read signal, comprises:(a) positioning said reproduction signal at a first position within a non-program area of said disc; (b) amplifying said read signal to produce an amplified signal; and (c) determining if said amplified signal has a valid signal level when said reproduction signal is positioned at said first position by evaluating said amplified signal; (d) if said amplified signal does not have the valid signal level when said reproduction signal is positioned at said first position, moving said reproduction signal to a second position within a program area of said disc; (e) determining if said amplified signal has the valid signal level when said reproduction signal is positioned at said second position.

In order to yet further achieve the above and other objects, a software program contained on a computer readable medium, which is executed by a controller that instructs a reproduction signal to be irradiated towards a disc to produce a corresponding read signal, is provided. The software program instructs the controller to perform the operations of: (a) positioning said reproduction signal at a first position within a non-program area of said disc; (b) attempting to focus said reproduction signal on said disc; (c) determining if said reproduction signal is focused on said disc by at least indirectly evaluating said read signal; (d) if said reproduction signal is focused on said disc, determining if said read signal has a valid signal level when said reproduction signal is positioned at said first position; (e) if said read signal does not have the valid signal level when said reproduction signal is positioned at said first position, moving said reproduction signal to a second position within a program area of said disc while said reproduction signal remains focused on said disc; and (f) determining if said read signal has the valid signal level when said reproduction signal is positioned at said second position.

In order to still further achieve the above and other objects, a software program contained on a computer readable medium, which is executed by a controller that instructs a reproduction signal to be irradiated towards a disc to produce a corresponding read signal, is provided. The software program instructs the controller to perform the operations of: (a) positioning said reproduction signal at a first position within a non-program area of said disc; (b) amplifying said read signal to produce an amplified signal; and (c) determining if said amplified signal has a valid signal level when said reproduction signal is positioned at said first position by evaluating said amplified signal; (d) if said amplified signal does not have the valid signal level when said reproduction signal is positioned at said first position, moving said reproduction signal to a second position within a program area of said disc; (e) determining if said amplified signal has the valid signal level when said reproduction signal is positioned at said second position.

BRIEF DESCRIPTION OF THE DRAWINGS

The above and other objectives and advantages of the present invention will become more apparent by describing in detail preferred embodiments thereof with reference to the attached drawings in which.

DESCRIPTION OF THE PREFERRED EMBODIMENTS

The following description of the preferred embodiments discloses specific configurations, components, and process operations. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and operations of the present invention that would have been known to one skilled in the art are omitted for the sake of clarity and brevity.

Figure 1:
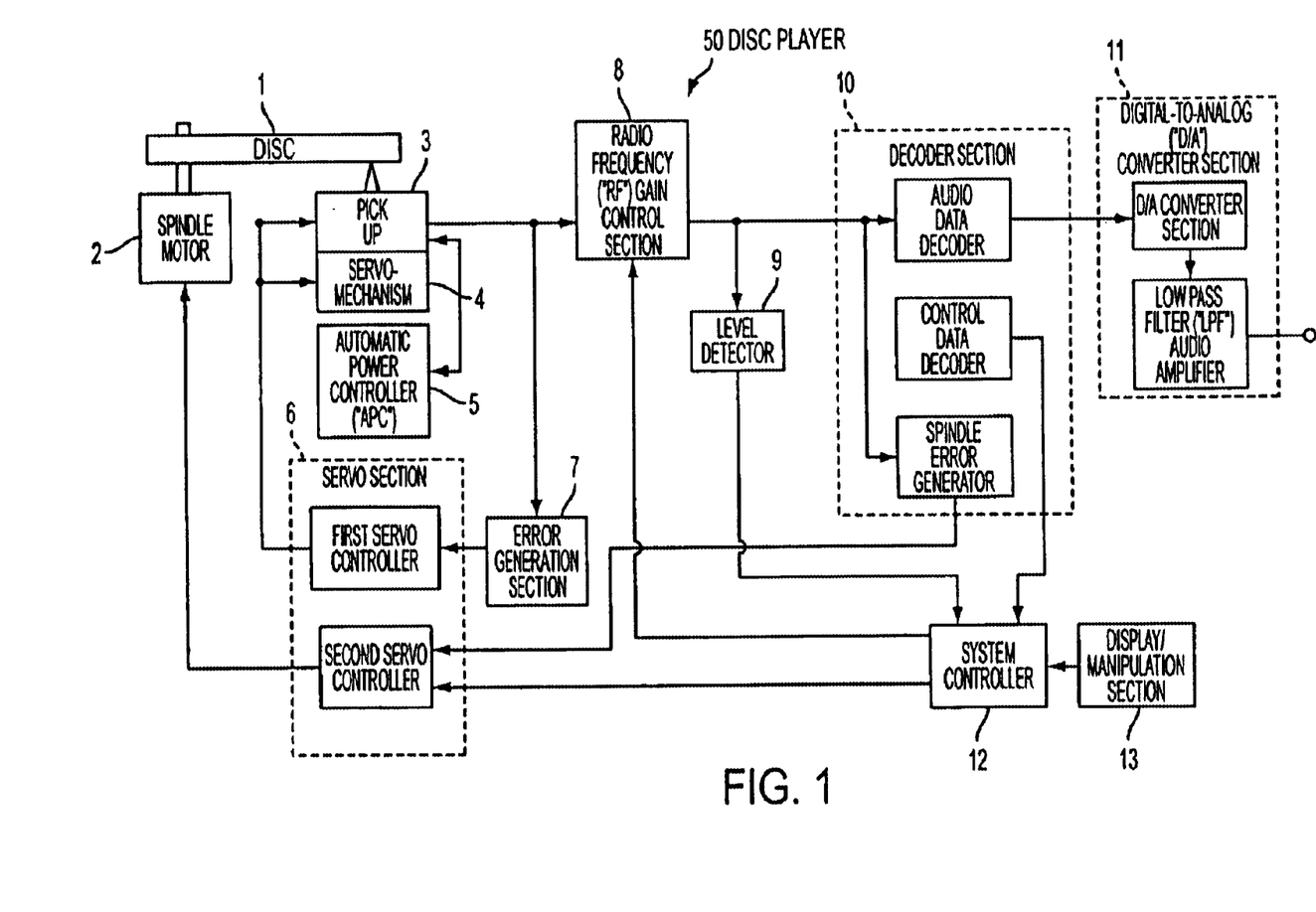
FIG. 1 shows an illustrative embodiment of a disc player according to the present invention.

FIG. 1 shows an example of a disc player 50 according to an illustrative embodiment of the present invention. As shown in the figure, the disc player 50 comprises a spindle motor 2, a pickup 3, and a servomechanism 4. The spindle motor 2 is driven to rotate a disc 1 loaded in the player 50, and the pickup 3 irradiates a laser beam on pits and/or lands of the disc 1. In addition, the laser beam reflects off of the disc 3 towards the pickup 3, and the pickup 3 photoelectrically converts the reflected beam into an electric pickup signal.

The servomechanism 4 comprises a carriage servomechanism, a tracking servomechanism, and a focusing servomechanism. The carriage servomechanism controls the rough positioning of the pickup 3 with respect to the disc 1 by moving a carriage, which supports the pickup 3, in the radial direction of the disc 1. The tracking servomechanism controls the fine positioning of the pickup 3 to ensure that the laser beam follows a particular recording track of the disc 1. The focusing servomechanism controls the pickup 3 so that the laser beam is focused at the reproduction layer of the disc 1.

The disc player 50 also comprises an automatic power controller ("APC") 5 and a servo section 6. The APC 5 keeps the strength of laser beam from the pickup 3 at a constant level, and the servo section 6 comprises a first servo controller 6a and a second servo controller 6b. The first servo controller 6a controls the tracking servomechanism, the carriage servomechanism, and the focus servomechanism. The second servo controller 6b controls a spindle servo circuit that controls the rotation of the spindle motor 2. The spindle servo circuit controls the rotation of the spindle motor 2 based on sync signals recorded on the disc 1 and has an frequency generator ("FG") servo section that controls the rotation of the spindle motor 2 by using a Hall element that is provided in the spindle motor 2.

The disc player 50 also contains an error generation section 7, a radio frequency ("RF") gain control section 8, a level detector 9, a decoder section 10, a digital-to-analog ("D/A") converter section 11, a system controller 12, and a display/manipulation section 13. The RF gain control section 8 inputs the pickup signal from the pickup 3 and amplifies the signal at a predetermined gain to produce an amplified RF signal. The error generation section 7 inputs the pickup signal that is output from the pickup 3 and generates corresponding error signals. The servo section 6 inputs the error signals and controls the spindle motor and the various servomechanisms based on the error signals. The level detector 9 inputs the amplified RF signal, determines whether or not the amplified RF signal has a predetermined signal level, and outputs a corresponding level detection signal.

The decoder section 10 comprises an audio data decoder 10a, a control data decoder 10b, and a spindle error generator 10c. The audio data decoder 10a inputs the amplified RF signal from the RF gain control section 8 and generates audio data by performing signal processing, such as eight-to-fourteen modulation ("EFM") demodulation and error correction, and generates sub-code data. The control data decoder 10b inputs the sub-code data, generates corresponding control data from the sub-code data, and outputs the control data to the controller 12. The spindle error generator 10c inputs the amplified RF signal from the RF gain control section 8, generates a corresponding spindle error signal, and outputs the spindle error signal to the second servo controller 6b.

The D/A converter section 11 comprises a D/A converter 11a and a low pass filter ("LPF") audio amplifier 11b. The D/A converter 11a inputs the digital audio data from the audio data decoder 10a, generates an analog audio signal based on the digital data, and outputs the analog signal to the LPF audio amplifier 11b. The audio amplifier 11b filters and amplifies the analog audio signal and outputs the resultant signal via an output terminal.

The system controller 12 comprises a microprocessor, a memory, and various other devices to control the operation of the entire disc player 50. For example, the controller 12 inputs the level detection signal from the level detector 9 and generates a corresponding gain control signal. The gain control signal is output to the RF gain control section 8 to selectively adjust the gain of an RF amplifier within the control section 8. Also, the controller 12 inputs various signals from the control data decoder 10b. Other connections exist between the controller 12 and the other components of the disc player 50, but such connections are not illustrated in FIG. 1 for the sake of brevity. Clearly, one skilled in the art, upon reading the present application, would understand where and how to establish the necessary connections. The display/manipulation section 13 receives user inputs for controlling the disc player 50, displays the operational status of the disc player 50, and displays information regarding the information being reproduced from the disc 1.

Figure 2:
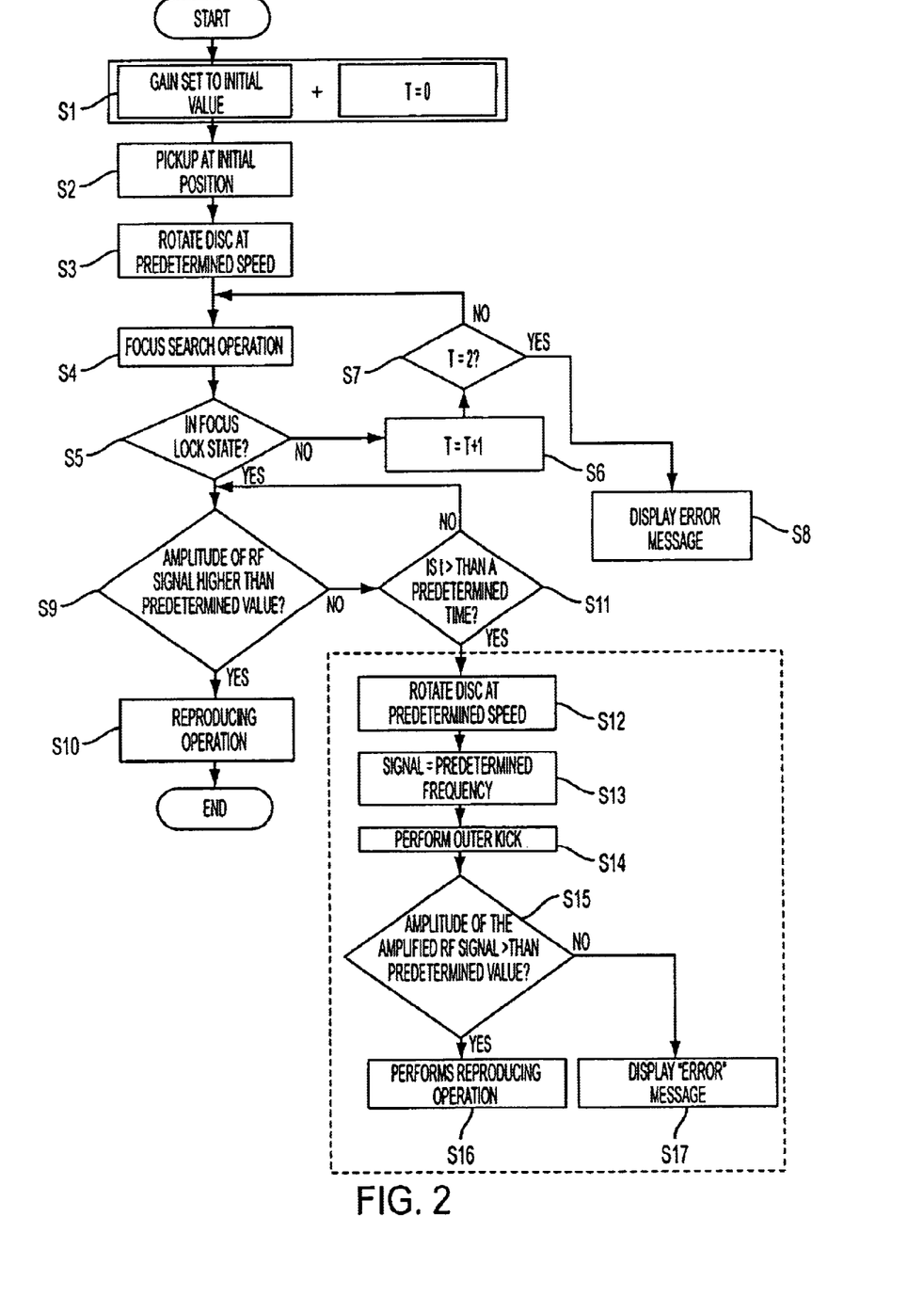
FIG. 2 shows an illustrative embodiment of a method performed by the disc player shown in FIG. 1.

FIG. 2 is an example of a flow chart of a program for controlling the operations of the disc player 50. In the present embodiment, the program is stored in a read only memory ("ROM") within the controller 12. However, the program may be stored in a random access memory ("RAM"), a floppy disc, a hard disc, an optical disc, a carrier wave (e.g. a carrier wave transmitted via the internet, a vertical blanking interval of a television signal, etc.), or any other computer readable medium. In the present embodiment, the controller 12 executes the program when a user inputs various commands via the display/manipulation section 13. However, in an alternative implementation, the program may be automatically executed whenever a disc 1 is loaded in the player 50. In addition, the program may be stored entirely within the controller 12, or portions of the program may be stored within the controller 12 and other portions of the program may be stored in other devices in the disc player 50.

Figure 4:
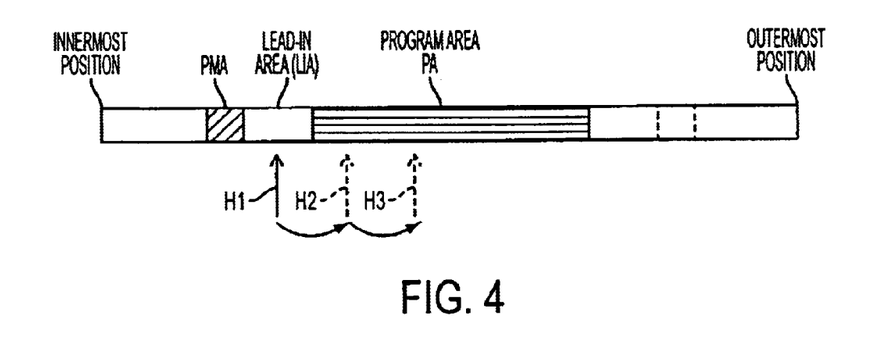
FIG. 4 shows an example of a compact disc reproduced by the disc player shown in FIG. 1.

In any event, when a user loads a disc 1 in the player 50 and pushes a reproduction button on the display/manipulation section 13, the system controller 12 initializes the servo section 6 for controlling the focusing servomechanism, the tracking servo mechanism, the carriage servo mechanism, the spindle servo circuit, etc. In addition, the gain of the RF amplifier within the RF gain control section 8 is set to an initial value, and a variable T is set to 0. (Operation S1). Then, the system controller 12 instructs the first servo controller 6a to control the carriage servomechanism and/or the tracking servomechanism to move the pickup 3 to an initial position H1 beneath the lead-in area LIA of the disc 1 as shown in FIG. 4. (Operation S2). Subsequently, the controller 12 instructs various devices to control the pickup 3 so that it irradiates a laser beam on the lead-in area LIA of the disc 1. Moreover, the controller 12 instructs the second servo controller 6b to control the spindle motor 2 to rotate the disc 1 at a predetermined rotational speed. (Operation S3).

Based on the laser beam that reflects off of the disc 1, the pickup 3 generates a pickup signal and outputs it to the RF gain control section 8. The control section 8 amplifies the signal based on the initial value of the gain to produce the amplified RF signal. The error generation circuit 7 inputs the pickup signal and generates a corresponding focus error signal and outputs it to the focusing servomechanism. Then, based on the focus error signal, the focus servomechanism attempts to focus the laser beam on the reproduction layer of the disc 1 by performing a focus search operation. During the focus search operation, the focus servomechanism moves an objective lens of the pickup 3 closer to the disc 2 or moves the lens farther away from the disc 1 to try to reduce the level of the focus error signal below a predetermined level. (Operation S4). When the focus error signal becomes less than a predetermined level (or falls within a predetermined range), the focus servo loop is closed and the disc player 50 is in a focus lock state.

The system controller 12 either directly or indirectly inputs the focus error signal or other relevant signals to determine if the laser beam becomes focused on the surface of the disc 1 and if the disc player 50 is placed in the focus lock state. (Operation S5). If the focus lock state is not achieved, 1 is added to the variable T (Operation S6), and then the system controller 12 determines whether or not the variable T is 2. (Operation S7). If the variable T is not 2, the system controller 12 executes the Operation S4 again. Thus, the focus search operation is performed again at operation S4, and the system controller 12 again determines whether the laser beam becomes focused on the disc 1 at the operation S5.

If the laser beam still is not focused at operation S5, 1 is again added to the variable T at Operation S6, and then the system controller 12 determines if the variable T is 2 at operation S7. Since the variable T becomes 2 at this time, the controller 12 stops attempting to reproduce the disc 1 and displays an "error" message on the display area of the display/manipulation section 13. (Operation S8). In other words, the system controller 12 determines that information cannot be reproduced from the disc 1 because the laser beam cannot be focused on the disc 1 even after this attempt is repeated.

On the other hand, if the system controller 12 determines that the laser beam is focused on the reproduction layer of the disc 1 in operation S5, the system controller 12 inputs the level detection signal from the level detector 9 to determine whether or not the amplitude of the amplified RF signal output from the RF gain control section 8 is higher than a predetermined value. (Operation S9). If the level detection signal indicates that the amplitude of the signal is higher than the predetermined value, the system controller 12 determines that the disc 1 is an ordinary disc (e.g. a CD-DA or a finalized CD-R). In such case, the system controller 12 performs a reproducing operation for an ordinary disc. (Operation S10). On the other hand, if the level detection signal indicates that the amplitude of the amplified RF signal is less than the predetermined value, the system controller 12 begins counting a time t that has elapsed from the time that the laser beam has been properly focused on the reproducing layer of the disc 1. Then, the controller 12 determines whether or not the counted time t is longer than a predetermined time (e.g. one second). (Operation S11).

If the counted time t is shorter than the predetermined time, the system controller 12 returns to operation S9 and determines whether or not the level of the amplified RF signal output from the control section 8 is larger than the predetermined value. On the other hand, if the counted time t is longer than the predetermined time, the system controller 12 instructs the FG servo section within the servo section 6 to rotate the spindle motor 2 so that the disc 1 rotates at a predetermined rotational speed. (Operation S12). When the disc 1 rotates at the predetermined speed, the frequency of the signal output from the RF gain control section 8 equals a predetermined frequency. Afterwards, the controller 12 instructs the servo section 6 to drive the tracking servomechanism and/or the carriage servomechanism within the servomechanism 4 to move the pickup 3 radially along the disc 1 to a position H2 beneath the program area PA of the disc 1. (FIG. 4). In other words, the servo section 6 drives the tracking servomechanism and/or the carriage servomechanism to perform an outer kick. (Operation S14). As a result, the objective lens of the pickup 3 is moved outward in the radial direction of the disc 1 while the laser beam remains focused on the disc 1.

Subsequently, the system controller 12 inputs the level detection signal from the level detector 9 and determines whether or not the amplitude of the amplified RF signal is larger than the predetermined value. (Operation S15). If the level of the RF signal is larger than the predetermined value, the system controller 12 determines that the disc 1 is a partial disc (FIG. 5b), and performs a reproducing operation for the partial disc. (Operation S16). On the other hand, if the level of the amplified RF signal is smaller than the predetermined value, the system controller 12 instructs the display/manipulation section 13 to display an "error" message and stops reproducing the disc 1. (Operation S17).

As described above, if the pickup 3 irradiates a laser beam on the lead-in area LIA of the disc 1 and the amplified RF signal output from the RF gain control section 8 has an amplitude that is larger than a predetermined value, the system controller 12 determines that the disc 1 is a CD-DA disc or a finalized CD-R disc. Thus, the controller 12 considers the disc 1 to be an ordinary disc and begins reproducing the disc 1. (Operation S10). On the other hand, if the amplitude of the amplified RF signal is less than the predetermined value when the pickup 3 is located beneath the lead-in area LIA (at the position H1) but is greater than the predetermined value when the pickup 3 is located beneath the program area PA (at the position H2), the system controller 12 determines that the disc 1 is a partial CD-R disc. Thus, the controller 12 begins reproducing the disc 1 based on a partial disc reproduction operation. (Operation S16). If the amplitude of the amplified RF signal is less than the predetermined value when the pickup is located at both the position H1 and the position H2, the system controller 12 determines that the disc 1 is a blank disc or an abnormal disc 1 and stops reproducing the disc 1. (Operation S17).

Another illustrative embodiment of the program executed by the controller 12 will be described in conjunction with FIG. 3. Since the operations S1–S11 of the present embodiment are identical to the operations S1–S11 described above in conjunction with the previous embodiment, a description of the operations S1–S11 will be omitted for the sake of brevity. In other words, operations S20–S27 that are shown in FIG. 3 may be substituted for the operations S12–S17 shown in FIG. 2.

Figure 3:
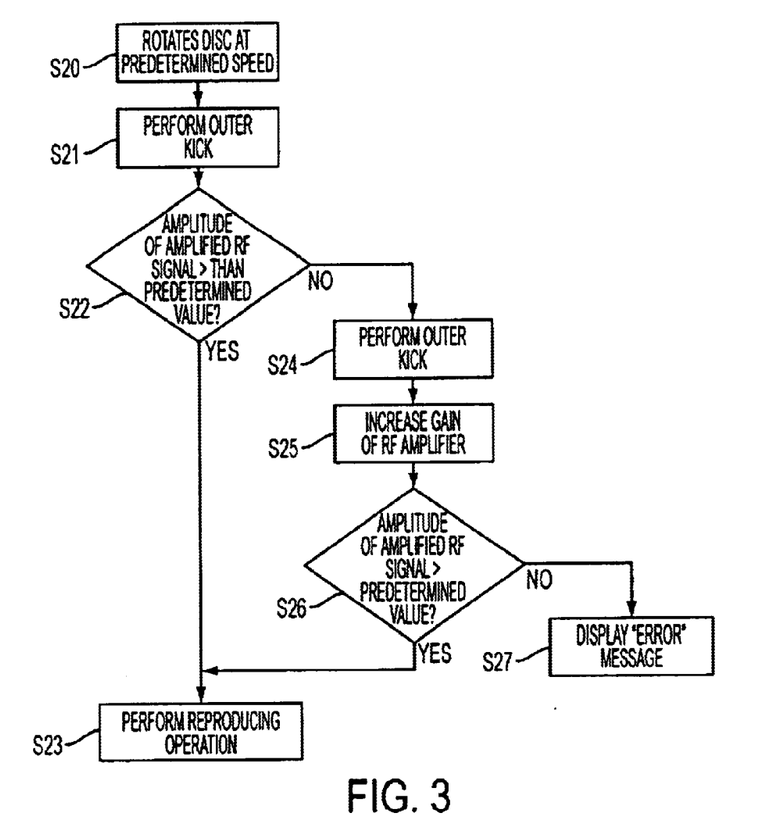
FIG. 3 shows an illustrative embodiment of another method performed by the disc player shown in FIG. 1.

As shown in FIGS. 2 and 3, if the counted time t is longer than the predetermined time (operation S11), the system controller 12 instructs the FG servo section within the servo section 6 to rotate the spindle motor 2 so that the disc 1 rotates at a predetermined rotational speed. (Operation S20). When the disc 1 rotates at the predetermined speed, the frequency of the amplified signal output from the RF gain control section 8 equals a predetermined frequency.

Afterwards, the controller 12 instructs the servo section 6 to drive the tracking servomechanism and/or the carriage servomechanism within the servomechanism 4 to move the pickup 3 radially along the disc 1 to the position H2 beneath the program area PA of the disc 1. (FIG. 4). In other words, the servo section 6 drives the tracking servomechanism and/or the carriage servomechanism to perform an outer kick. (Operation S21). As a result, the objective lens of the pickup 3 is moved outward in the radial direction of the disc 1 while the laser beam remains focused on the disc 1.

Subsequently, the system controller 12 inputs the level detection signal from the level detector 9 and determines whether or not the amplitude of the amplified RF signal is larger than the predetermined value. (Operation S22). If the level of the RF signal is larger than the predetermined value, the system controller 12 determines that the disc 1 is a partial disc (FIG. 5b), and performs a reproducing operation for the partial disc. (Operation S23).

On the other hand, if the level of the amplified RF signal is smaller than the predetermined value, the controller 12 again instructs the servo section 6 to drive the tracking servomechanism and/or the carriage servomechanism within the servo mechanism 4 to move the pickup 3 radially along the disc 1 to a position H3 beneath the program area PA of the disc 1. (FIG. 4). (Operation S24). As a result, the objective lens of the pickup 3 is again moved outward in the radial direction of the disc 1 while the laser beam remains focused on the disc 1.

Then, the system controller 12 controls the RF gain control section 8 to increase the gain of the RF amplifier within the gain control section 8 to a predetermined value (e.g. about 6.4 dB). (Operation S25). After the gain of the RF amplifier has been increased, the system controller 12 inputs the level detection signal from the level detector 9 to determine whether or not the amplitude of the amplified RF signal output from the RF gain control section 8 is higher than a predetermined value. (Operation S26). If the level detection signal indicates that the amplitude of the signal is higher than the predetermined value, the system controller 12 determines that the disc 1 is a partial disc (FIG. 5b), and performs a reproducing operation for the partial disc. (Operation S23). On the other hand, if the level detection signal indicates that the amplitude of the amplified RF signal is less than the predetermined value, the system controller 12 instructs the display/manipulation section to display an "error" message and stops reproducing disc 1. (Operation S27). In other words, if the amplitude of the amplified RF signal is still less than the predetermined value when the pickup 3 is located at the position H3 beneath the program area PA, the system controller 12 determines that the disc 1 is a blank disc or an abnormal disc 1 and stops reproducing the disc 1.

The reason why the gain of the RF amplifier is increased at operation S25 is to enable the disc player 50 to adequately detect an amplified RF signal that is generated when either a CD-R or a CD-DA is loaded in the disc player 50. Specifically, the amount of the laser beam that is reflected off of a CD-R is substantially less than the amount of the laser beam that is reflected off of a CD-DA. Thus, if a CD-R is loaded in the disc player 50, there is possibility the reflected laser beam does not produce a sufficiently large RF signal. However, when the gain of the RF amplifier is increased, such as to about 6.4 dB, the reflected laser beam produces an amplified RF signal that is large enough to be detected.

As described above, if the pickup 3 irradiates a laser beam on the lead-in area LIA of the disc 1 and the amplified RF signal output from the RF gain control signal 8 has an amplitude that is larger than a predetermined value, the system controller 12 determines that the disc 1 is a CD-DA disc or a finalized CD-R disc. Thus, the controller 12 considers the disc 1 to be an ordinary disc and begins reproducing the disc 1. (Operation S10). On the other hand, if the amplitude of the amplified RF signal is less than the predetermined value when the pickup 3 is located beneath the lead-in area LIA (at the position H1) but is greater than the predetermined value when the pickup 3 is located beneath the program area PA (at the position H2), the system controller 12 determines that the disc 1 is a partial CD-R disc. Thus, the controller 12 begins reproducing the disc 1 based on a partial disc reproduction operation. (Operation S23). If the amplitude of the amplified RF signal is less than the predetermined value when the pickup 3 is located at both the position H1 and the position H2 but is greater than the predetermined value when the pickup is located at another position H3 beneath the program area PA, the system controller 12 determines that the disc 1 is a partial CD-R disc. In such case, the controller 12 begins reproducing the disc 1 based on the partial disc reproduction operation. (Operation S23). However, if the amplitude of the amplified RF signal is less than the predetermined value when the pickup 3 is located at the positions H1, H2, and H3, the system controller 12 determines that the disc 1 is a blank disc or an abnormal disc 1 and stops reproducing the disc 1. (Operation S27).

In the embodiments described above, the system controller 12 keeps the laser beam emitted from the pickup 3 focused on the disc 1 (i.e. the disc player 50 remains in a focus lock state) when the pickup 3 is moved from the position H1 to the positions H2 and/or H3 beneath the disc 1. As a result, performing a focus search operation after the pickup 3 is moved to the positions, H2 and/or H3 is not necessary. Therefore, the system controller 12 can quickly and easily determine whether or not the level of the amplified RF signal output from the RF gain control section 8 is greater than a predetermined level. Consequently, the system controller 12 can quickly determine the type of disc 1 that is loaded into the disc player 50 and can quickly begin reproducing the disc 1 or determine that it is unable to reproduce the disc 1.

The order in which the various operations are performed in FIGS. 2 and 3 are merely illustrative, and one skilled in the art would clearly understand how to perform many of the operations in a different order without departing from the spirit of the present invention. Furthermore, one skilled in the art would also realize that many of the operations can be omitted from, and other operations could be added to, the processes shown in FIGS. 2 and 3.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, in the embodiments discussed above, a CD-DA and a CD-R are reproduced, but the present invention is in no way limited to reducing a specific recording medium. Specifically, a CD-RW, DVD, or other type of recording medium could be reproduced by the disc player 50. Therefore, the present invention is not intended to be limited to the embodiments described herein but is to be accorded the widest scope as defined by the limitations of the claims and equivalents thereof.

What is claimed is:

1. An apparatus for reproducing information recorded on a disc, comprising:
    a reading device that reads information recorded on said disc, wherein said reading device transmits a reproduction signal towards said disc such that said reproduction signal reflects off of said disc to produce a reflected reproduction signal and wherein said reading device outputs a read signal based on said reflected reproduction signal;
    a turning device that turns said disc; and
    a controller which controls said turning device to turn said disc, and positions said reading device at a first position within a non-program area of said disc and instructs said reading device to focus said reproduction signal on said disc as said disc turns,
    wherein, said controller determines if said read signal output from said reading device has a valid signal level when said reading device is positioned at said first position, when said disc is turning,
    wherein, if said read signal does not have the valid signal level when said reading device is positioned at said first position, said controller moves said reading device to a second position within a program area of said disc while said reproduction signal remains focused on said disc, when said disc is turning, and
    wherein said controller determines if said read signal output from said reading device has a valid signal level when said reading device is positioned at said second position.

2. The apparatus as claimed in claim 1, wherein said second position is closer to an outer circumference of said disc than said first position.

3. The apparatus as claimed in claim 1, wherein said disc comprises a lead-in area and a program area,
    wherein said first position is located said lead-in area and said second position is located said program area.

4. The apparatus as claimed in claim 3, wherein said read signal does not have the valid signal level when said reading device is positioned at said first position and when said lead-in area does not contain any information.

5. The apparatus as claimed in claim 3, wherein said disc is a partially recorded CD-R.

6. The apparatus as claimed in claim 1, wherein, if said read signal output from said reading device has the valid signal level when said reading device is positioned at said first position, said controller determines that said disc is one of a completely recorded disc and a digital audio compact disc.

7. The apparatus as claimed in claim 1, wherein, if said read signal output from said reading device has the valid signal level when said reading device is positioned at said second position, said controller determines that said disc is a partially recorded disc.

8. The apparatus as claimed in claim 1, wherein, if said read signal output from said reading device does not have the valid signal level when said reading device is positioned at said second position, said controller determines that said disc cannot be reproduced.

9. The apparatus as claimed in claim 1, further comprising:
    an amplifier which amplifies said read signal at a gain to produce an amplified signal, wherein said gain has a first gain level,
    wherein said controller determines if said read signal has the valid signal level when said reading device is positioned at said first position by at least indirectly evaluating said amplified signal.

10. The apparatus as claimed in claim 1, further comprising:
    an amplifier which amplifies said read signal at a gain to produce an amplified signal, wherein said gain has a first gain level,
    wherein said controller determines if said read signal has the valid signal level when said reading device is positioned at said second position by at least indirectly evaluating said amplified signal.

11. An apparatus for reproducing information recorded on a disc, comprising:

a reading device that reads information recorded on said disc and outputs a corresponding read signal;

a turning device that turns said disc;

a controller that focuses a reproduction signal, which provides the read signal, on said disc as said disc rotates; and an amplifier that amplifies said read signal to produce an amplified signal; wherein:

said controller positions said reading device at a first position within a non-program area of said disc and determines if said amplified signal output from said reading device has a valid signal level when said reading device is positioned at said first position by evaluating said amplified signal, as said disc rotates;

wherein, if said amplified signal does not have the valid signal level when said reading device is positioned at said first position, said controller moves said reading device to a second position within a program area of said disc, wherein said controller determines if said amplified signal output from said reading device has the valid signal level when said reading device is positioned at said second position, as said disc rotates.

12. A method for reproducing information recorded on a disc, wherein a reproduction signal is irradiated towards said disc to produce a corresponding read signal, comprising:

(a) positioning said reproduction signal at a first position within a non-program area of said disc;

(b) turning said disc;

(c) attempting to focus said reproduction signal on said disc, as said disc turns;

(d) determining if said reproduction signal is focused on said disc by at least indirectly evaluating said read signal;

(e) if said reproduction signal is focused on said disc, determining if said read signal has a valid signal level when said reproduction signal is positioned at said first position, as said disc turns;

(f) if said read signal does not have the valid signal level when said reproduction signal is positioned at said first position, moving said reproduction signal to a second position within a program area of said disc while said reproduction signal remains focused on said disc; and (g) determining if said read signal has the valid signal level when said reproduction signal is positioned at said second position, as said disc turns.

13. The method as claimed in claim 12, wherein said second position is closer to an outer circumference of said disc than said first position.

14. The method as claimed in claim 12, wherein said disc comprises a lead-in area and a program area, wherein said first position is located within said lead-in area and said second position is located within said program area.

15. The method as claimed in claim 14, wherein said read signal does not have the valid signal level when said reproduction signal is positioned at said first position and when said lead-in area does not contain any information.

16. The method as claimed in claim 14, wherein said disc is a partially recorded CD-R.

17. The method as claimed in claim 12, wherein said method further comprises:

(h) if said read signal has the valid signal level when said reproduction signal is positioned at said first position, determining that said disc is one of a completely recorded disc and a digital audio compact disc.

18. The method as claimed in claim 12, wherein said method further comprises:

(h) if said read signal has the valid signal level when said reproduction signal is positioned at said second position, determining that said disc is a partially recorded disc.

19. The method as claimed in claim 12, wherein said method further comprises:

(h) if said read signal does not have the valid signal level when said reproduction signal is positioned at said second position, determining that said disc cannot be reproduced.

20. The method as claimed in claim 12, wherein said operation (e) comprises:

(e1) amplifying said read signal at a gain to produce an amplified signal, wherein said gain has a first gain level; and (e2) determining if said read signal has the valid signal level when said reproduction signal is positioned at said first position by at least indirectly evaluating said amplified signal.

21. The method as claimed in claim 12, wherein said operation (g) comprises:

(g1) amplifying said read signal at a gain to produce an amplified signal, wherein said gain has a first gain level; and (g2) determining if said read signal has the valid signal level when said reproduction signal is positioned at said second position by at least indirectly evaluating said amplified signal.

22. A method for reproducing information recorded on a disc, wherein a reproduction signal is irradiated towards said disc to produce a corresponding read signal, comprising:

(a) positioning said reproduction signal at a first position within a non-program area of said disc;

(b) turning said disc;

(c) focusing said reproduction signal on said disc as said disc rotates;

(d) amplifying said read signal to produce an amplified signal; and (e) determining if said amplified signal has a valid signal level when said reproduction signal is positioned at said first position by evaluating said amplified signal, as said disc rotates;

(f) if said amplified signal does not have the valid signal level when said reproduction signal is positioned at said first position, moving said reproduction signal to a second position within a program area of said disc;

(g) determining if said amplified signal has the valid signal level when said reproduction signal is positioned at said second position, as said disc rotates.

23. A software program contained on a computer readable medium which is executed by a controller that instructs a reproduction signal to be irradiated towards a disc to produce a corresponding read signal, wherein the software program instructs the controller to perform the operations of:

(a) positioning said reproduction signal at a first position within a non-program area of said disc;

(b) turning said disc;

(c) attempting to focus said reproduction signal on said disc, as said disc turns;

(d) determining if said reproduction signal is focused on said disc by at least indirectly evaluating said read signal;

(e) if said reproduction signal is focused on said disc, determining if said read signal has a valid signal level when said reproduction signal is positioned at said first position, as said disc turns;

(f) if said read signal does not have the valid signal level when said reproduction signal is positioned at said first position, moving said reproduction signal to a second position and a program area of said disc while said reproduction signal remains focused on said disc; and (g) determining if said read signal has the valid signal level when said reproduction signal is positioned at said second position, as said disc turns.

24. The software program as claimed in claim 23, wherein said second position is closer to an outer circumference of said disc than said first position.

25. The software program as claimed in claim 23, wherein said disc comprises a lead-in area and a program area, wherein said first position is located within said lead-in area and said second position is located within said program area.

26. The software program as claimed in claim 25, wherein said read signal does not have the valid signal level when said reproduction signal is positioned at said first position and when said lead-in area does not contain any information.

27. The software program as claimed in claim 25, wherein said disc is a partially recorded CD-R.

28. The software program as claimed in claim 23, wherein said software program further instructs the controller to perform the operations of:

(h) if said read signal has the valid signal level when said reproduction signal is positioned at said first position, determining that said disc is one of a completely recorded disc and a digital audio compact disc.

29. The software program as claimed in claim 23, wherein said software programs further instructs the controller to perform the operations of:

(h) if said read signal has the valid signal level when said reproduction signal is positioned at said second position, determining that said disc is a partially recorded disc.

30. The software program as claimed in claim 23, wherein said software program further instructs the controller to perform the operations of:

(h) if said read signal does not have the valid signal level when said reproduction signal is positioned at said second position, determining that said disc cannot be reproduced.

31. The software program as claimed in claim 23, wherein said operation (e) comprises:

(e1) amplifying said read signal at a gain to produce an amplified signal, wherein said gain has a first gain level; and (e2) determining if said read signal has the valid signal level when said reproduction signal is positioned at said first position by at least indirectly evaluating said amplified signal.

32. A software program contained on a computer readable medium which is executed by a controller that instructs a reproduction signal to be irradiated towards a disc to produce a corresponding read signal, wherein the software program instructs the controller to perform the operations of:

(a) positioning said reproduction signal at a first position within a non-program area of said disc;

(b) turning said disc;

(c) focusing said reproduction signal on said disc, as said disc rotates;

(d) amplifying said read signal to produce an amplified signal; and (e) determining if said amplified signal has a valid signal level when said reproduction signal is positioned at said first position by evaluating said amplified signal, as said disc rotates;

(f) if said amplified signal does not have the valid signal level when said reproduction signal is positioned at said first position, moving said reproduction signal to a second position within a program area of said disc;

(g) determining if said amplified signal has the valid signal level when said reproduction signal is positioned at said second position, as said disc rotates.

33. The apparatus as claimed in claim 1, further comprising:

an amplifier which amplifies said read signal at a gain to produce an amplified signal, wherein said gain has a first gain level when said reading device is positioned at said first and said second positions, wherein, if said read signal does not have the valid signal level when said reading device is positioned at said second position:

said controller moves said reading device to a third position within a program area of said disc while said reproduction signal remains focused on said disc and said disc is turning, said gain is increased to a second gain level; and said controller determines if said read signal output from said reading device and amplified by said second gain level has a valid signal level when said reading device is positioned at said third position.

34. The apparatus as claimed in claim 33, wherein, if said read signal output from said reading device has the valid signal level when said reading device is positioned at said third position, said controller determines that said disc is a partially recorded disc.

35. The apparatus as claimed in claim 33, wherein, if said read signal output from said reading device does not have the valid signal level when said reading device is positioned at said third position, said controller determines that said disc cannot be reproduced.

36. The apparatus as claimed in claim 11, wherein, if said amplified signal does not have the valid signal level when said reading device is positioned at said second position:

said controller moves said reading device to a third position within a program area of said disc while said reproduction signal remains focused on said disc and said disc is turning, a gain of said amplifier is increased to provide a second amplified signal; and said controller determines if said second amplified signal output from said reading device has a valid signal level when said reading device is positioned at said third position.

37. The apparatus as claimed in claim 36, wherein, if said second amplified signal output from said reading device has the valid signal level when said reading device is positioned at said third position, said controller determines that said disc is a partially recorded disc.

38. The apparatus as claimed in claim 36, wherein, if said second amplified signal output from said reading device does not have the valid signal level when said reading device is positioned at said third position, said controller determines that said disc cannot be reproduced.

39. The method as claimed in claim 12, further comprising:

(h) amplifying said read signal at a gain to produce an amplified signal, wherein said gain has a first gain level when said reproduction signal is positioned at said first and said second positions, wherein, if said read signal does not have the valid signal level when said reproduction signal is positioned at said second position:

(i) moving said reproduction signal to a third position within a program area of said disc while said reproduction signal remains focused on said disc and said disc is turning, (j) increasing said gain to a second gain level; and (k) determining if said read signal amplified by said second gain level has a valid signal level when said reproduction signal is positioned at said third position.

40. The apparatus as claimed in claim 39, wherein:

(l) if said read signal has the valid signal level when said reproduction signal is positioned at said third position, determining that said disc is a partially recorded disc.

41. The apparatus as claimed in claim 39, wherein:

(l) if said read signal does not have the valid signal level when said reproduction signal is positioned at said third position, determining that said disc cannot be reproduced.

42. The method as claimed in claim 22, wherein, if said amplified signal does not have the valid signal level when said reproduction signal is positioned at said second position:

(h) moving said reproduction signal to a third position within a program area of said disc while said reproduction signal remains focused on said disc and said disc is turning, (i) increasing a gain of said amplifier to provide a second amplified signal; and (j) determining if said second amplified signal has a valid signal level when said reproduction signal is positioned at said third position.

43. The apparatus as claimed in claim 42, wherein:

(k) if said second amplified signal has the valid signal level when said reproduction signal is positioned at said third position, determining that said disc is a partially recorded disc.

44. The apparatus as claimed in claim 42, wherein:

(k) if said second amplified signal does not have the valid signal level when reproduction signal is positioned at said third position, determining that said disc cannot be reproduced.

45. The software program as claimed in claim 23, said operation further comprising:

(h) amplifying said read signal at a gain to produce an amplified signal, wherein said gain has a first gain level when said reproduction signal is positioned at said first and said second positions, wherein, if said read signal does not have the valid signal level when said reproduction signal is positioned at said second position:

(i) moving said reproduction signal to a third position within a program area of said disc while said reproduction signal remains focused on said disc and said disc is turning, (j) increasing said gain to a second gain level; and (k) determining if said read signal amplified by said second gain level has a valid signal level when said reproduction signal is positioned at said third position.

46. The software program as claimed in claim 45, wherein:

(l) if said read signal has the valid signal level when said reproduction signal is positioned at said third position, determining that said disc is a partially recorded disc.

47. The software program as claimed in claim 45, wherein:

(l) if said read signal does not have the valid signal level when said reproduction signal is positioned at said third position, determining that said disc cannot be reproduced.

48. The software program as claimed in claim 32, wherein, if said amplified signal does not have the valid signal level when said reproduction signal is positioned at said second position:

(h) moving said reproduction signal to a third position within a program area of said disc while said reproduction signal remains focused on said disc and said disc is turning, (i) increasing a gain of said amplifier to provide a second amplified signal; and (j) determining if said second amplified signal has a valid signal level when reproduction signal is positioned at said third position.

49. The software program as claimed in claim 48, wherein:

(k) if said second amplified signal has the valid signal level when said reproduction signal is positioned at said third position, determining that said disc is a partially recorded disc.

50. The software program as claimed in claim 48, wherein:

(k) if said second amplified signal does not have the valid signal level when reproduction signal is positioned at said third position, determining that said disc cannot be reproduced.

51. A method for reproducing information recorded on a disc, comprising:

arranging a pickup unit beneath a disc so that it is movable between a first position corresponding to a lead-in area of the disc, and a second position corresponding to a program area of the disc adjacent to the lead in area;

irradiating a laser beam on the disc from the pickup unit;

receiving the laser beam in the pickup unit after reflection from the disc;

outputting a signal corresponding to the received laser beam;

amplifying the signal to provide an amplified signal;

positioning said pickup unit at said first position; wherein:

if the amplitude of the amplified signal is larger than a predetermined value when said pickup is at the first position, classifying the disc to be an ordinary disc and reproducing the disc;

if the amplitude of the amplified signal is less than the predetermined value when the pickup is located at the first position, moving said pickup to said second position;

if the amplitude of the amplified signal is larger than the predetermined value when the pickup is located beneath the second position, classifying the disc as a partial CD-R disc and reproducing the disc; and if the amplitude of the amplified signal is less than the predetermined value when the pickup is located at both the first position and the second position, classifying the disc as a blank or abnormal disc and stopping reproduction of the disc.

52. A method for reproducing information recorded on a disc, comprising:

arranging a pickup unit beneath a disc so that it is movable between a first position corresponding to a lead-in area of the disc, a second position corresponding to a program area of the disc adjacent to the lead in area, and a third position corresponding to a program area of the disc radially outwardly adjacent to the second position;

irradiating a laser beam on the disc from the pickup unit;

receiving the laser beam in the pickup unit after reflection from the disc;

outputting a signal corresponding to the received laser beam;

amplifying the signal to provide an amplified signal;

positioning said pickup unit at said first position; wherein:

if the amplitude of the amplified signal is larger than a predetermined value when said pickup is at the first position, classifying the disc to be an ordinary disc and reproducing the disc;

if the amplitude of the amplified signal is less than the predetermined value when the pickup is located at the first position, moving said pickup to said second position;

if the amplitude of the amplified signal is larger than the predetermined value when the pickup is located beneath the second position, classifying the disc as a partial CD-R disc and reproducing the disc; and if the amplitude of the amplified signal is less than the predetermined value when the pickup is located at the second position, moving said pickup to the third position and increasing a gain by which said signal is obtained to provide a higher gain amplified signal;

if the amplitude of the higher gain amplified signal is larger than the predetermined value when the pickup is located beneath the third position, classifying the disc as a partial CD-R disc and reproducing the disc; and if the amplitude of the higher gain amplified signal is less than the predetermined value when the pickup is located at the third position, classifying the disc as a blank or abnormal disc and stopping reproduction of the disc.

53. A method for reproducing information recorded on a disc, comprising:

moving a pickup to a first position beneath a lead-in area of the disc;

irradiating a reproduction signal from the pickup onto the lead-in area;

rotating the disc;

outputting a pickup signal from the pickup to a gain control section;

amplifying the pickup signal based on an initial gain to produce an amplified signal;

focusing the laser beam on the disc;

determining if the laser beam becomes focused on the disc;

determining if the amplitude of the amplified signal output from the gain control section is higher than a predetermined value;

if the amplitude is higher, determining that the disc is an ordinary disc and performing a reproducing operation for an ordinary disc;

if the amplitude is lower, counting a time t that has elapsed from the time that the reproduction signal has been properly focused on the disc;

determining whether or not the counted time t is longer than a predetermined time;

if the counted time t is longer than the predetermined time, spinning the disc at a predetermined speed so that the frequency of the signal output from the gain control section equals a predetermined frequency;

moving the pickup radially along the disc to a second position beneath the program area of the disc while the reproduction signal remains focused on the disc; and determining whether or not the amplitude of the amplified signal is larger than the predetermined value while the pickup is positioned at said second position.

54. The method for reproducing information claimed in claim 53, further comprising, if the level of the amplified signal is larger than the predetermined value when the pickup is positioned at said second position, determining that the disc is a partial disc; and performing a reproducing operation for the partial disc.

55. The method for reproducing information claimed in claim 53, further comprising, if the level of the amplified signal is smaller than the predetermined value when the pickup is positioned at said second position, instructing a display section to display an "error" message; and stopping reproducing the disc.

56. The method for reproducing information claimed in claim 53, further comprising, if the level of the amplified signal is smaller than the predetermined value when the pickup is positioned at said second position:

moving the pickup radially along the disc to a third position beneath the program area of the disc while the reproduction signal remains focused on the disc;

increasing the initial gain to a higher gain to produce a higher gain amplified signal; and determining whether or not the amplitude of the higher gain amplified signal is larger than the predetermined value, wherein:

if the amplitude of the higher gain amplified signal is larger than the predetermined value when the pickup is located beneath the third position, classifying the disc as a partial disc and reproducing the disc; and if the amplitude of the higher gain amplified signal is less than the predetermined value when the pickup is located at the third position, classifying the disc as a blank or abnormal disc and stopping reproduction of the disc.

57. An apparatus for reproducing information recorded on a disc, comprising:

reading means for reading information recorded on said disc, wherein said reading means transmits a reproduction signal towards said disc such that said reproduction signal reflects off of said disc to produce a reflected reproduction signal and wherein said reading means outputs a read signal based on said reflected reproduction signal;

turning means for turning said disc; and controller means for controlling said turning means to turn said disc, for positioning said reading means at a first position within a non-program area of said disc, and for instructing said reading means to focus said reproduction signal on said disc as said disc turns, wherein, said controller means determines if said read signal output from said reading means has a valid signal level when said reading means is positioned at said first position, when said disc is turning, wherein, if said read signal does not have the valid signal level when said reading means is positioned at said first position, said controller means moves said reading means to a second position within a program area of said disc while said reproduction signal remains focused on said disc, when said disc is turning, and wherein said controller means determines if said read signal output from said reading means has a valid signal level when said reading means is positioned at said second position.

58. An apparatus for reproducing information recorded on a disc, comprising:

reading means for reading information recorded on said disc and outputs a corresponding read signal;

turning means for turning said disc;

controller means for focusing a reproduction signal, which provides the read signal, on said disc as said disc rotates; and amplifier means for amplifying said read signal to produce an amplified signal; wherein:

said controller means positions said reading means at a first position within a non-program area of said disc and determines if said amplified signal output from said reading means has a valid signal level when said reading device is positioned at said first position by evaluating said amplified signal, as said disc rotates;

wherein, if said amplified signal does not have the valid signal level when said reading means is positioned at said first position, said controller means moves said reading means to a second position within a program area of said disc, wherein said controller means determines if said amplified signal output from said reading means has the valid signal level when said reading means is positioned at said second position, as said disc rotates.

* * * * *